(12) United States Patent
Chen

(10) Patent No.: US 6,327,161 B1
(45) Date of Patent: Dec. 4, 2001

(54) POWER-SAVING CIRCUIT

(75) Inventor: Chi-Jen Chen, Taoyuan (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/479,480

(22) Filed: Jan. 10, 2000

(30) Foreign Application Priority Data

Jan. 13, 1999 (TW) ................................................. 88100469

(51) Int. Cl.[7] ................................................. H02M 3/335
(52) U.S. Cl. ................................................. 363/21.12; 363/16
(58) Field of Search .................................. 363/21.01, 37, 363/89, 20, 95, 98, 21.12, 16

(56) References Cited

U.S. PATENT DOCUMENTS

| | | | |
|---|---|---|---|
| 4,782,355 | 11/1988 | Sakai et al. | 354/400 |
| 4,945,300 | * 7/1990 | Sato et al. | 323/318 |
| 5,905,491 | * 5/1999 | Kim | 345/212 |
| 5,910,891 | * 6/1999 | Jo | 363/89 |

FOREIGN PATENT DOCUMENTS

| | | |
|---|---|---|
| 36 21 212 C2 | 1/1987 | (DE) . |
| 94/12969 A1 | 6/1994 | (WO) . |

OTHER PUBLICATIONS

Sukumar, Vajapeyam, et al., "An Automatic Line Voltage Switching Circuit", *SGS–Thomson Microelectronics*, pp. 1–6 (1995).

* cited by examiner

*Primary Examiner*—Adolf Deneke Berhane
(74) *Attorney, Agent, or Firm*—Ladas & Parry

(57) ABSTRACT

A power circuit of an electronic device which can reduce power consumption. Power is saved by turning off the voltage booster in the power-saving mode. A controller is used to generate a control signal indicating whether or not the electronic device is in a power-saving mode. A switch, coupled between the voltage booster and its power supply, is used for disconnecting the power supply from the voltage booster when the control signal indicates that the electronic device is in the power-saving mode.

21 Claims, 4 Drawing Sheets

POWER-SAVING CIRCUIT

BACKGROUND OF THE INVENTION

1. Field of the Invention

The present invention generally relates to a power-saving circuit for an electronic device. More specifically, the present invention relates to a power-saving circuit applied to the power supply circuit of a monitor. When the monitor is in a power-saving mode, this power-saving circuit can automatically turn off the power supply fed to the voltage booster of the monitor for reducing the power consumption of the monitor.

2. Description of the Related Art

In order to decrease wasted power, most computers in the current market can automatically detect usage/non-usage and enter a power-saving mode if required. Generally speaking, the power-saving mode can be further divided into several finer sub-modes. For the sake of clarity, however, only two modes, the normal mode and the power-saving mode, are discussed.

When a computer is set to enter the power-saving mode, the monitor of the computer is also notified. While in the power-saving mode, the monitor only provides power supply to essential circuitry that is used to continuously receive instructions from the computer and to quickly recover the normal mode when receiving the corresponding instruction.

Referring to FIG. 1 (Prior Art), an ordinary computer system includes a computer mainframe 20, a monitor 28 and other accessories. Computer mainframe 20 can detect the usage condition and decide, according to the detection result, whether or not the computer system enters the power-saving mode. When deciding to enter the power-saving mode, computer mainframe 20 does not only enter into power-saving mode itself, but also notifies monitor 28 to enter the power-saving mode.

The modern monitor usually includes a voltage booster at the entry point of the external power supply for dealing with different voltage specifications. The voltage booster is mainly comprised of booster controllers, triac devices and other related components. In addition, the voltage booster can detect the alternative current (AC) voltage supplied by the external power supply and selectively boost the AC voltage according to the detection result. For example, suppose that the internal circuit of a monitor is designed for 200~220 VAC. When detecting that the external power supply is 200~220 VAC, the voltage booster can directly connect the external power supply to the internal circuit. When detecting that the external power supply is 100~110 VAC, the voltage booster can boost the external power supply and then connect it to the internal circuit. Using the boosting scheme, this monitor can be used in various environments.

FIG. 2 (Prior Art) is a circuit diagram of the power supply circuit applied in the conventional monitor. As shown in FIG. 2, the power supply circuit includes a voltage booster 320, a first rectifier 310, a second rectifier 300 and a first power-saving circuit 370. For the sake of clarity, FIG. 2 only illustrates a partial circuit that provides 15 VDC as a second rectifier 300 located in the secondary winding of transformer T1. In reality, there are several different circuits in the secondary winding for providing different voltages, such as −15V and 5V. IC1 represents a booster controller chip, which is used to detect the amplitude of the external power supply and decide whether the triac chip IC4 should perform the boosting operation.

Suppose that the monitor in FIG. 2 is designed for 200~220 VAC. The booster controller chip IC1 can be implemented by AVS1AC or AVS1BC developed by SGS-Thomson and the triac chip IC4 can be implemented by AVS08CB developed by SGS-Thomson. Nodes AC1 and AC2 are connected to two terminals of the external AC power supply, respectively. When detecting that the external power supply is 200~220 VAC, the booster controller chip IC1 disables the triac chip IC4, and nodes A1 and A2 of the triac chip IC4 are open-circuited. Therefore, the voltage on node A is about $200\times\sqrt{2}$~$220\times\sqrt{2}$. On the other hand, when detecting that the external power supply is 100~110 VAC, the booster controller chip IC1 enables the triac chip IC4, and nodes A1 and A2 of the triac chip IC4 are close-circuited. Therefore, the voltage on node A can be boosted from the original voltage $100\times\sqrt{2}$~$110\times\sqrt{2}$ to $200\times\sqrt{2}$~$220\times\sqrt{2}$. Using such scheme, the potential of node A can be maintained in $200\times\sqrt{2}$~$220\times\sqrt{2}$ in different operating environments. Accordingly, the monitor can be normally operated.

A mode-detection chip IC3 is used to receive instructions indicating the current mode from computer mainframe 20. When receiving an instruction indicating the normal mode, the mode-detection chip IC3 outputs a logic high signal to turn on transistor Q3 and transistor Q4. Then second rectifier 300 can provide power to the internal circuit of the monitor 28. When receiving an instruction indicating the power-saving mode, the mode-detection chip IC3 outputs a logic low signal to turn off transistor Q3 and transistor Q4. Then the second rectifier 300 stops providing power to the internal circuit of the monitor 28. Therefore, the conventional monitor saves power by stopping the power supply connected to the secondary windings of the transformer T1. However, since the voltage booster 320 is directly connected to the external AC power supply, it is inevitable that the voltage booster 320 still consumes a certain amount of power. In fact, the power consumption of the voltage booster 320 is quite large.

SUMMARY OF THE INVENTION

Therefore, an object of the present invention is to provide a power-saving circuit applied to an electronic device, which can turn off the voltage booster in the power-saving mode, thereby reducing power consumption.

The present invention achieves the above-indicated objects by providing a power circuit for an electronic device. It comprises a power terminal for connecting to an external power source of the electronic device, a voltage booster that is connected to the power terminal and powered by a power supply for selectively boosting the received external power source, a controller for generating a control signal indicating whether or not the electronic device is in power-saving mode, and a switch for disconnecting the power supply from the voltage booster when the control signal indicates that the electronic device is in power-saving mode. The controller and the switch can be used as a power-saving circuit for controlling the power supply of the voltage booster.

Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

First Embodiment

Figure 1:
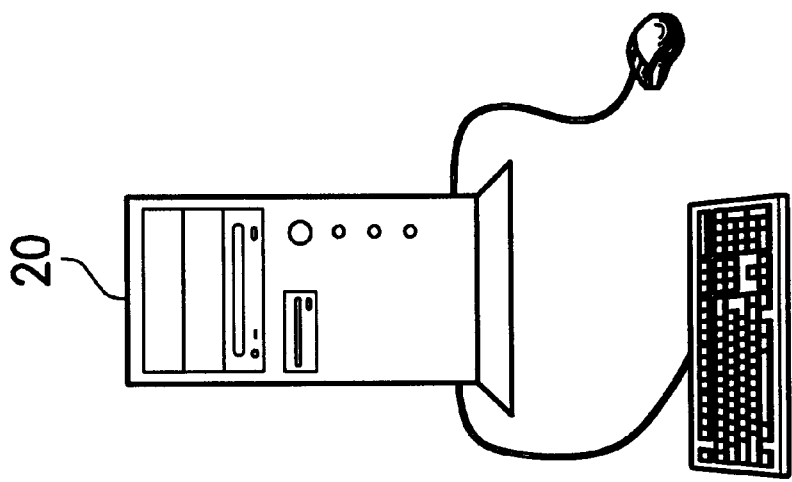
FIG. 1 (Prior Art) is a diagram of an ordinary computer system.
Figure 1:
Figure 1:
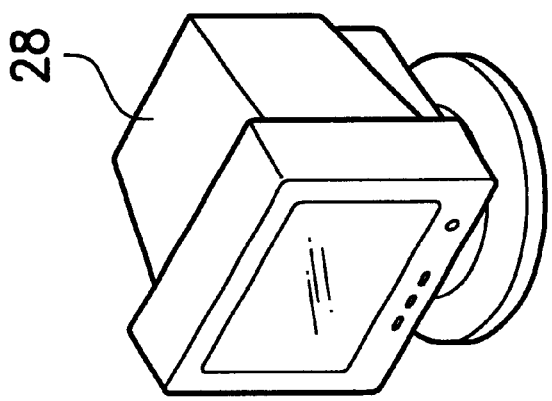
Figure 2:
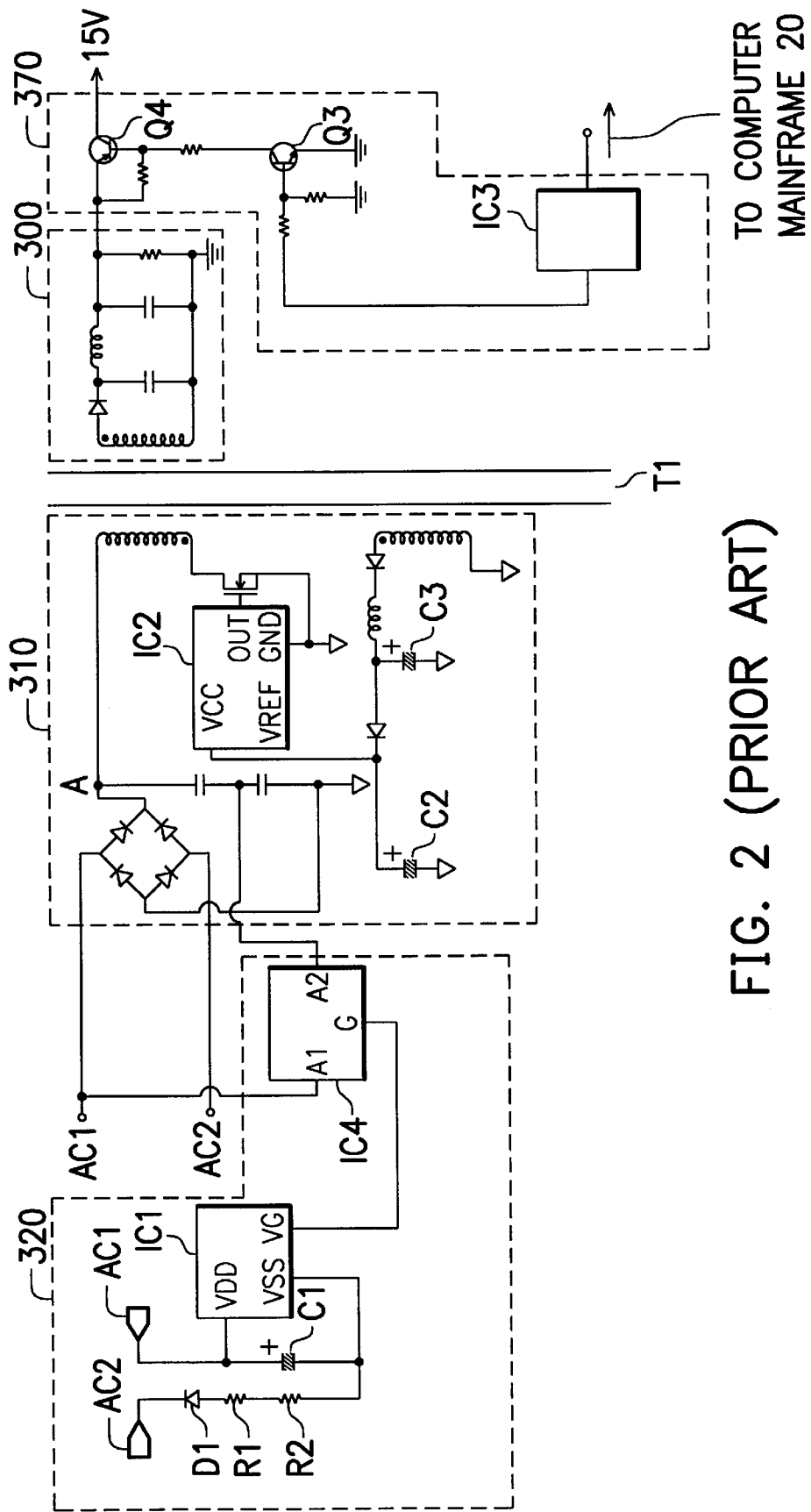
FIG. 2 (Prior Art) is a circuit diagram of the power circuit used in the conventional monitor.
Figure 3:
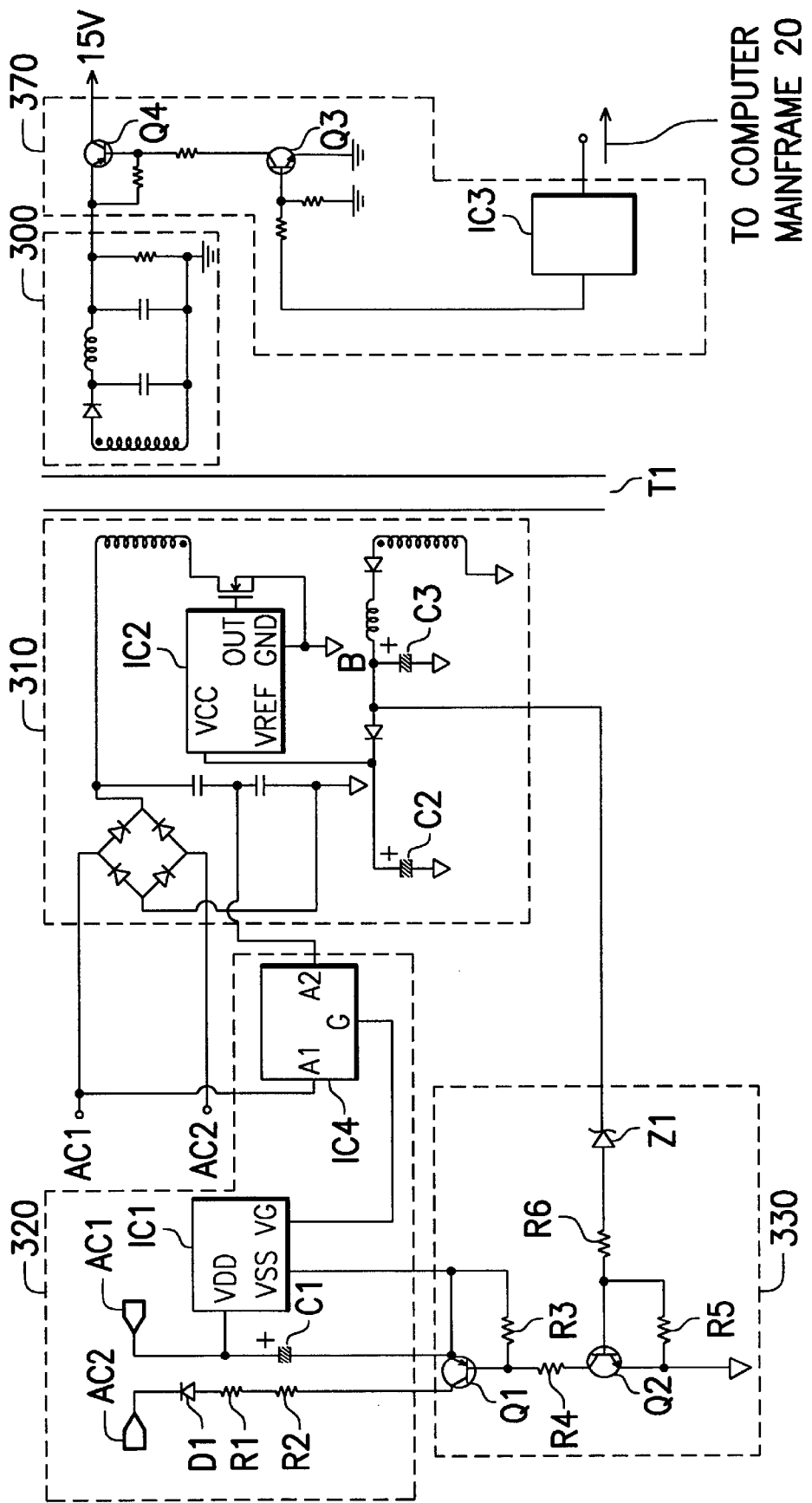
FIG. 3 is a circuit diagram of the power circuit used in the first embodiment of the present invention.

FIG. 3 is a circuit diagram of the power circuit used in the first embodiment. Compared with the circuit shown in FIG. 2, the power circuit in FIG. 3 further includes a second power-saving circuit 330. The second power-saving circuit 330 has two transistors (Q1 and Q2), four resistors (R3~R6) and a zener diode Z1. In this embodiment, the breakdown voltage of the zener diode Z1 is about 15V. The function of the second power-saving circuit 330 is described as follows.

When receiving an instruction indicating the normal mode from computer mainframe 20, the mode-detection chip IC3 outputs a logic high signal to turn on transistor Q3 and transistor Q4. Then second rectifier 300 provides power to the internal circuit of monitor 28. In practice, the voltage on node B in the primary winding of the transformer T1 is about 18V when the secondary winding of the transformer T1 properly provides power. Since the voltage of node B, which is about 18V, is larger than the breakdown voltage of the zener diode Z1, transistors Q1 and Q2 are turned on in this case. Therefore, the external power supply provides power to the booster controller chip IC1 via nodes AC1 and AC2, and monitor 28 operates normally.

When receiving an instruction indicating the power-saving mode from computer mainframe 20, the mode-detection chip IC3 outputs a logic low signal to turn off transistor Q3 and transistor Q4. Then second rectifier 300 stops providing power to the internal circuit of monitor 28. Since there is a load reduction in the secondary winding of transformer T1, the voltage of node B at the primary winding is also reduced to 13V in practice. Since the voltage on the node B, which is about 13V, is smaller than the breakdown voltage of the zener diode Z1, transistors Q1 and Q2 are turned off in this case. Therefore, the external power supply is not coupled to the booster controller chip IC1 via the nodes AC1 and AC2. Accordingly, the booster controller chip IC1 ceases to operate when in power-saving mode.

In this embodiment, the power-saving efficiency is improved since the booster controller chip IC1 does not waste power in the power-saving mode. It is noted that the breakdown voltage of the zener diode Z1 is a critical parameter in this embodiment. It is necessary that the zener diode Z1 be turned on in the normal mode and off in the power-saving mode.

Second Embodiment

Figure 4:
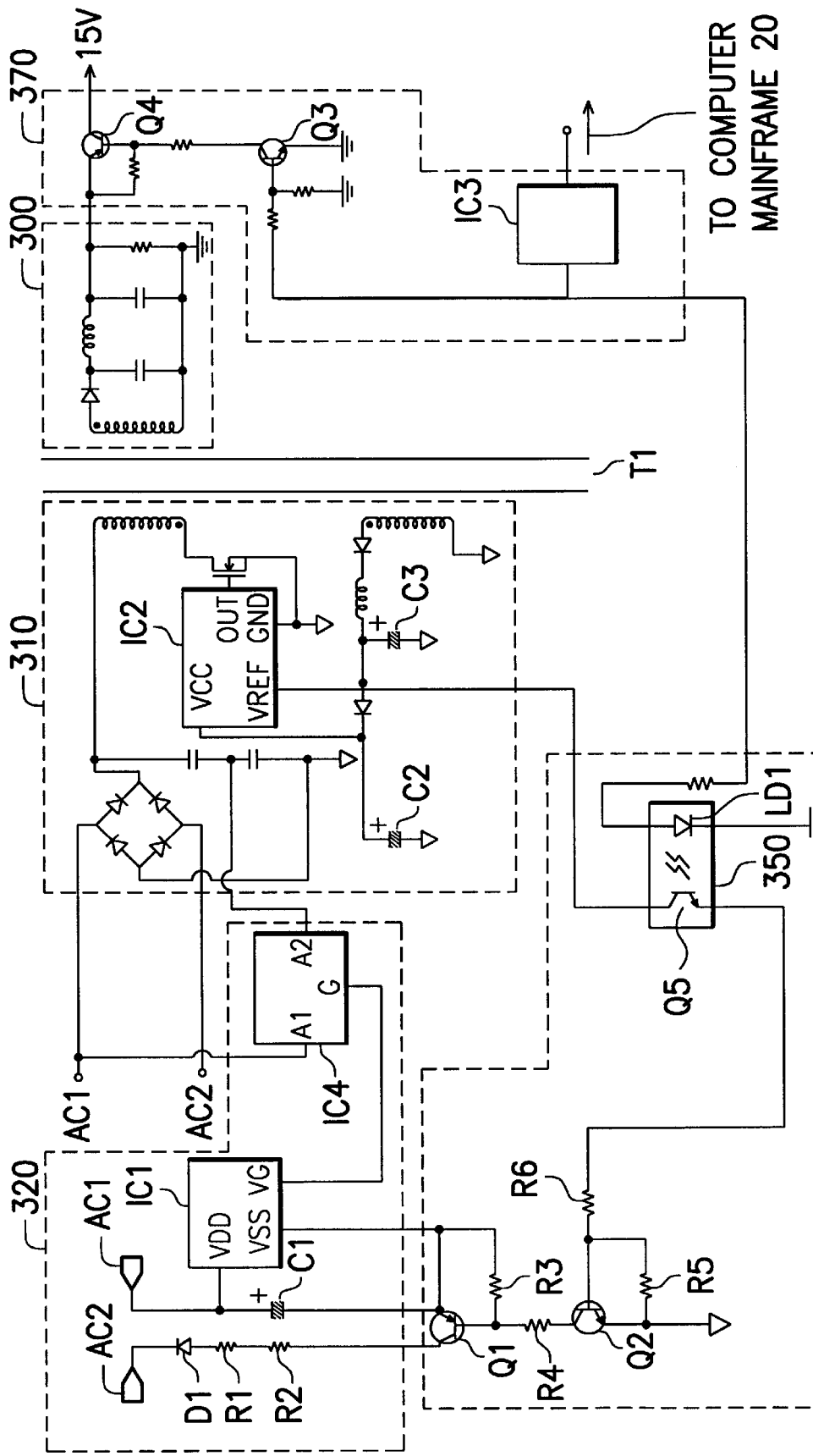
FIG. 4 is a circuit diagram of the power circuit used in the second embodiment of the present invention.

FIG. 4 is a circuit diagram of the power circuit used in the second embodiment. The power circuit shown in FIG. 4 is similar to that in FIG. 3, except that the zener diode Z1 is replaced by a photo coupler 350. The photo coupler 350 includes a photo emitter L1 and a photo receiver Q5. Photo emitter L1 is connected to the output terminal of the mode-detection chip IC3. Photo receiver Q5 is powered by a reference voltage VREF (about 5V) of the rectifier chip IC2. The operation of the second power-saving circuit 340 is described as follows.

When receiving an instruction indicating the normal mode from computer mainframe 20, the mode-detection chip IC3 outputs a logic high signal to turn on transistor Q3 and transistor Q4. Then second rectifier 300 provides power to the internal circuit of monitor 28. In addition, the logic high signal is also transmitted to photo receiver Q5 via the coupling operation of photo coupler 350. Since the photo receiver Q5 is turned on, transistors Q1 and Q2 are turned on in this case. Therefore, the external power supply provides power to the booster controller chip IC1 via nodes AC1 and AC2, and monitor 28 operates normally.

When receiving an instruction indicating the power-saving mode from computer mainframe 20, the mode-detection chip IC3 outputs a logic low signal to turn off transistor Q3 and transistor Q4. Then the second rectifier 300 stops providing power to the internal circuit of monitor 28. Since this logic low signal cannot turn on the photo emitter L1, photo receiver Q5 and transistors Q1 and Q2 are turned off in this case. Therefore, the external power supply is not coupled to the booster controller chip IC1 via nodes AC1 and AC2. Accordingly, the booster controller chip IC1 ceases to operate when in power-saving mode.

The advantage of the present invention is the stopping of the operation of the voltage booster when in power-saving mode. Therefore, the power-saving efficiency of the present invention is better than that of the prior art. In addition, the power-saving circuit of the present invention can be applied not only in the cathode ray tube (CRT) monitor, but also in many electronic devices that include voltage boosters and can be operated in power-saving mode, such as liquid crystal display (LCD) monitors, projectors and digital televisions.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A power circuit for an electronic device, comprising:
    a power terminal for connecting to an external power source of the electronic device;
    a voltage booster, connected to the power terminal and powered by a power supply, for selectively boosting the voltage of the external power source;
    a receiving terminal for receiving a control signal indicating whether or not the electronic device is in a power-saving mode; and
    a switch for disconnecting the power supply from the voltage booster when the control signal indicates that the electronic device is in the power-saving mode.

2. The power circuit as recited in claim 1, wherein the power supply supplied to the voltage booster is the external power source and the switch is located between the external power source and the voltage booster.

3. The power circuit as recited in claim 2, wherein the switch has a first transistor and a second transistor.

4. The power circuit as recited in claim 1, wherein the switch includes a zener diode with a breakdown voltage that is fed by the control signal and the state of the switch depends on the relation between the control signal and the breakdown voltage.

5. The power circuit as recited in claim 1, wherein the switch includes a photo coupler that is fed by the control signal and the state of the switch depends on the control signal.

6. The power circuit as recited in claim 1, wherein the electronic device is a monitor.

7. The power circuit as recited in claim 1, wherein the electronic device is a projector.

8. The power circuit as recited in claim 1, wherein the electronic device is a digital television.

9. The power circuit as recited in claim 1, wherein the voltage booster selectively doubles the voltage of the external power source.

10. A power circuit for an electronic device powered by an external AC power source, comprising:

a power terminal for connecting to the external AC power source;

a voltage booster, connected to the power terminal and powered by a power supply, for selectively boosting the voltage received from the power terminal;

a transformer;

a first rectifier connected to the primary winding of the transformer and the voltage booster;

a second rectifier, connected to the secondary winding of the transformer, for generating a stable DC voltage; and a power-saving circuit for controlling the power supply of the voltage booster;

wherein the power-saving circuit disconnects the power supply from the voltage booster when the electronic device is in a power-saving mode.

11. The power circuit as recited in claim 10, wherein the power-saving circuit comprises:

a controller for generating a control signal indicating whether or not the electronic device is in the power-saving mode; and a switch for disconnecting the power supply from the voltage booster when the control signal indicates that the electronic device is in the power-saving mode.

12. The power circuit as recited in claim 11, wherein the power supply supplied to the voltage booster is the external power source and the switch is located between the external power source and the voltage booster.

13. The power circuit as recited in claim 12, wherein the switch has a first transistor and a second transistor.

14. The power circuit as recited in claim 11, wherein the controller is coupled to the first rectifier.

15. The power circuit as recited in claim 14, wherein the switch includes a zener diode with a breakdown voltage that is fed by the control signal and the state of the switch depends on the relation between the control signal and the breakdown voltage.

16. The power circuit as recited in claim 11, wherein the controller is coupled to the second rectifier.

17. The power circuit as recited in claim 16, wherein the switch includes a photo coupler that is fed by the control signal and the state of the switch depends on the control signal.

18. The power circuit as recited in claim 10, wherein the electronic device is a monitor.

19. The power circuit as recited in claim 10, wherein the electronic device is a projector.

20. The power circuit as recited in claim 10, wherein the electronic device is a digital television.

21. The power circuit as recited in claim 10, wherein the voltage booster selectively doubles the voltage received from the power terminal.

* * * * *